Aug. 4, 1970   P. M. CLIFFORD ET AL   3,523,247
ELECTRICAL RESISTANCE COMPARISON DEVICE UTILIZING
AN INDUCTIVE RADIO STANDARD
Filed Dec. 19, 1967   3 Sheets-Sheet 1
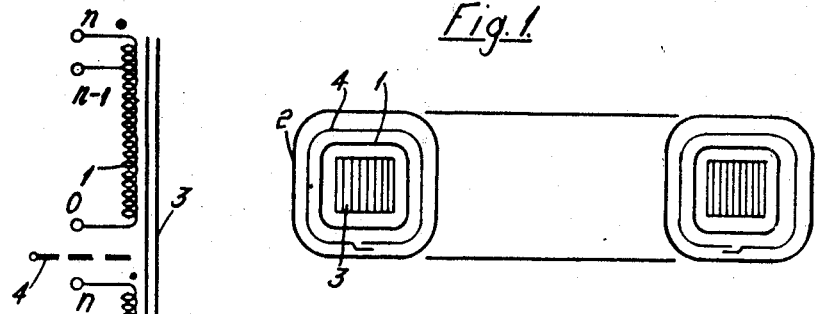
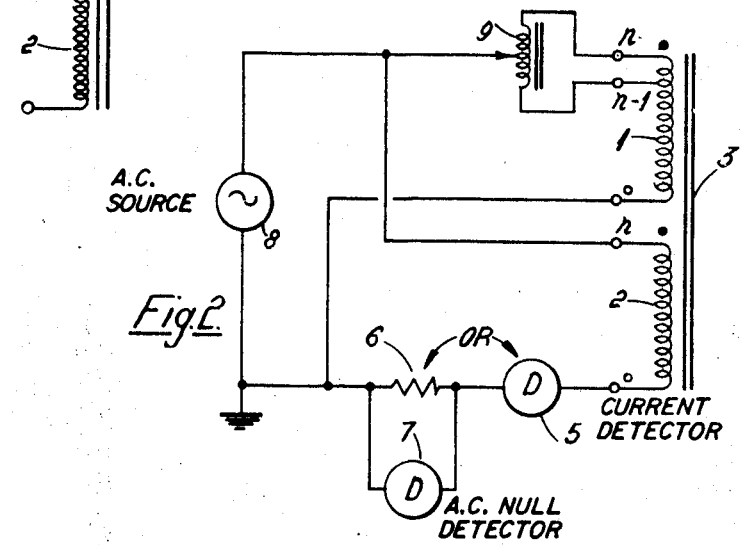
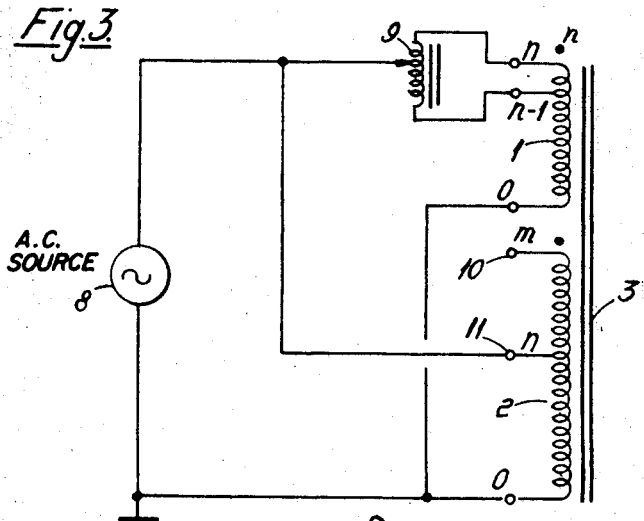

Aug. 4, 1970     P. M. CLIFFORD ET AL     3,523,247
ELECTRICAL RESISTANCE COMPARISON DEVICE UTILIZING
AN INDUCTIVE RADIO STANDARD
Filed Dec. 19, 1967                              3 Sheets-Sheet 2

Inventors:-
Peterson Miller Clifford
Alan Hubert Silcocks
By
Dowell & Dowell
Attorneys 3,523,247
ELECTRICAL RESISTANCE COMPARISON
DEVICE UTILIZING AN INDUCTIVE
RATIO STANDARD
Peterson Miller Clifford, Edgeare, and Alan Hubert
Silcocks, Billericay, England, assignors to Hawker Siddeley Dynamics Limited, Hatfield, and H. W. Sullivan Limited, Kent, England
Filed Dec. 19, 1967, Ser. No. 691,875
Int. Cl. G01n 27/02; H01f 15/04
U.S. Cl. 324—62                                  10 Claims

ABSTRACT OF THE DISCLOSURE

Electrical circuitry for comparing an unknown resistor with a standard resistor by means of an inductive ratio standard, the standard resistor and the unknown resistor being operated on steady D.C. and the inductive ratio standard being operated on a form of alternating current.

---

This invention relates to electromagnetic inductive devices of the kind known as inductive ratio standards.

An ideal measurement consists in determining the pure number ratio between an object and a standard. In electrical measurements, a nearly perfect standard of ratio is the inductive ratio standard (see for example Hill and Miller Proc. I.E.E., pt. B, March 1962, page 157). Such a device enables a resistance of unknown value to be determined by comparison with a standard resistance in a standardising laboratory. The inductive ratio standard is, in essence, a toroidal transformer, comprising matched windings disposed on a high permeability magnetic core.

It is the object of the invention to provide a means for accurately determining the ratio between a standard and an unknown resistance using an inductive ratio standard.

According to one aspect of the invention, the standard resistor and the unknown resistor are operated on steady D.C. and the inductive ratio standard is operated on a form of alternating current.

In general, it is desirable to be able to place the standard resistor, and possibly the unknown resistor, in a medium whose temperature, and hence that of the resistors, can be measured. This will usually be a circulating liquid bath placed at a short distance from the main apparatus. In order to obviate the effect of lead resistance and to make possible the measurement of low value resistors the apparatus in the preferred from is designed to measure four-terminal resistances.

While a properly constructed inductive ratio standard can provide a standard of ratio of very high accuracy, its accuracy of ratio is, however, slightly dependent on the mutual equality of resistance of the windings which form, in effect, a resistance divider superimposed on the inductive divider. This is caused by the lack of perfect equality of the voltage drops of the exciting current of the inductive ratio standard in the various winding resistances; similar errors are caused by lack of perfect equality of the reactive (capacitative and inductive) strays.

Existing high grade inductive standards achieve their accurate results by careful attention to keeping the distributed resistance and reactive components accurately related. This requires the exciting current to be kept very small so as to minimise the possibly unequal resistance voltage drops, and it is usual to employ a very high permeability magnetic core and windings with a low resistance.

It is another object of the invention to overcome these disadvantages. According to a further aspect of the invention, provision is made for the core magnetising flux to be supplied by a "slave" winding. The turns ratio between this slave winding and the measuring winding is adapted so that, although they are connected to the same supply, the measuring winding carries no current, and its E.M.F. is hence solely produced by electromagnetic induction.

Ways of carrying the invention into effect will now be discussed with reference to the accompanying drawings, in which:

FIG. 2 is a diagram of a circuit incorporating the windings of FIG. 1,

FIG. 3 shows a modified form of the circuit of FIG. 2,

FIG. 4 shows how inductive ratio standard windings can be connected and disconnected by means of linked switches, FIG. 5 is a diagram of a more refined circuit, FIG. 6 is a wave form diagram illustrating the timing of a relay in the circuit of FIG. 5, and FIG. 7 is a further circuit diagram illustrating a practical way of using the improved inductive ratio standard.

Figure 1:
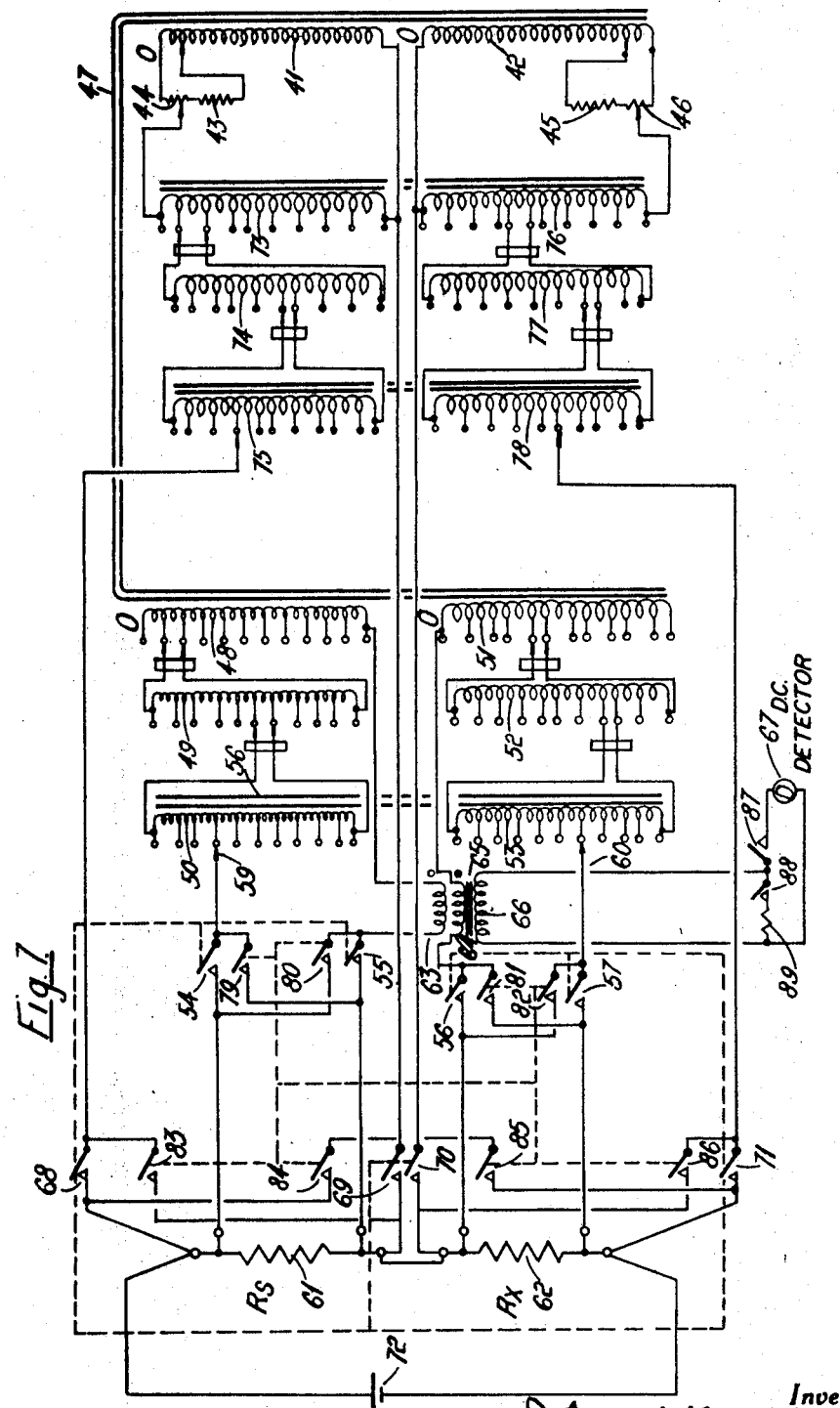
FIG. 1 shows a magnetic core and windings in cross section.

In FIG. 1, a winding 1 is placed around a circular magnetic core and has $n$ turns. On top of this is wound a further winding 2, also having $n$ turns. To ensure that the only E.M.F. induced into the winding 2 is that produced by electromagnetic induction, it is convenient to cover the winding 1 with a non-short-circuiting earthed electrostatic screen 4.

If the winding 1 is conected to a source of alternating voltage, the E.M.F. induced into the winding 2 will be somewhat less than the voltage appearing across the winding 1 even though they have the same magnetic core, because of the voltage drops produced by the exciting current in the winding resistance and leakage reactive component of the winding 1. If, however, a small step-up turns ratio is arranged between the winding 1 and the winding 2, it may be selected that the E.M.F. induced into the winding 2 exactly equals the supply voltage.

In FIG. 2 a source of alternating power 8, is, in effect, connected to the windings 1 and 2 in parallel. However, a device 9 is provided whereby the source 8 may be connected across somewhat less than the total number of turns of the winding 1. In general, the reduction in turns will be less than one thousandth of the number of turns of the winding 1, and the device 9 can consist of coils of the inductive ratio standard form with "input" terminals connected to the $n$th and $(n-1)$th turns of the winding 1 and with the source 8 connected to the "output" of the device. A resistance interpolating device such as a Kelvin-Varley slide or a Rayleigh potentiometer can similarly be employed.

It will be understood that instead of reducing the number of turns of the winding 1, it would also be possible to increase the number of turns of the winding 2 by connecting the device 9 between $n$th and $(n+1)$th turns of winding 2. This is usually less convenient, as it destroys the precise equality of turns and E.M.F. ratios of winding 2.

In use, connected as shown in FIG. 2, the device 9 is adjusted until a null is obtained on a current detector 5. Or if, as is more commonly the case, the A.C. null detector is a voltage-operated device 7, it may be connected across a current-sensing resistor 6. Reactive compensation as necessary is applied to the winding 1 in the usual known manner. As there is now no current flowing in the winding 2, its turns, if they are properly and uniformly coupled to each other and to the core flux (as by the method of Hill and Miller—Proc. I.E.E., pt. B, March 1962, page 157) provide a very accurate sub-division of the supply voltage.

Again, because the winding 2 carries no current, it may be arranged to deliver a larger E.M.F. than the supply voltage to the winding 1 by increasing the number of turns in the winding 2 beyond the point of connection 11 of the supply up to a further terminal 10 as shown in FIG. 3, to provide a total number of turns $m$. The ratio of E.M.F.'s is precisely the ratio of turns of the winding 2, i.e. the ratio of E.M.F. at terminal 10
E.M.F. at terminal 11 is precisely $m/n$. The method of use of the inductive ratio standard to determine the value of an unknown resistor will now be described. In FIG. 4 an inductive ratio standard 12 may be connected to and disconnected from a D.C. source 13 by linked switches 14 and 15. The unknown resistor 16 and the standard resistor 17 are likewise connected in series across the source 13, and a D.C. detector 18 such as a galvanometer, is connected between the junction point of the resistors and the tapping 19 of the device 12. If the switches 14 and 15 are closed, the ratio of the D.C. E.M.F. from terminals 19–20 to the E.M.F. from terminals 21–20 will be the turns ratio $k:n$. If the tapping 19 is adjusted until the detector 18 does not deflect, then $$\frac{R_x}{R_s} = \frac{k}{n-k}$$

However, it will be necessary to open switches 14 and 15 substantially before the current has risen to a value which will saturate the magnetic core of the inductive ratio standard or overheat its windings.

The circuit may be rearranged as shown in FIG. 5 in order to make it direct reading and four-terminal. A double inductive ratio standard 22 is employed the two windings 23 and 24 of which are very tightly coupled, as by both consisting of wires in the same rope. A core-balance transformer has primaries 25 and 26 and a secondary winding 27. It gives an A.C. signal output. Relay contacts 28, 29, 30 and 31 serve to connect windings 23 and 24 intermittently across the terminals of resistors 17 and 16. Relay contacts 28, 29, 30 and 31 are operated by a relay A (not shown). Similarly, relay contacts 32, 33, 34 and 35 intermittently connect windings 23 and 24 across the terminals of resistors 17 and 16 in the reverse sense to that provided by relay contacts 28, 29, 30 and 31. Relay contacts 32, 33, 34 and 35 are operated by a relay B (not shown). The contacts of relay B thus reverse the core flux produced by relay A, and maintain the core of the inductive ratio standard in a cyclic state whose mean flux level is zero.

Shortly after relay A operates, contact 36 (of a relay C—not shown) closes and connects the galvanometer 37 to winding 27. Contact 36 opens shortly before relay A releases. Similarly, contact 38 (of a relay D—not shown) closes shortly after relay B operates and opens shortly before relay B releases. The relay timing is shown in FIG. 6. The detector 37 is thus connected into the circuit only after switching surges have died down.

Resistor 39 (equal to the D.C. resistance of the detector 37) is connected across winding 27 by contact 38; it compensates for any current taken by the detector 37 and avoids any D.C. magnetization of the transformer core 40.

Winding 23, connected to the standard resistor 17, is arranged as a multi-decade inductive ratio standard in the usual manner (Hill and Miller, op. cit.), the junction point of relay contacts 28 and 32 being connected to what would normally be the output point. A similar arrangement applies to winding 24. The conventional arrangement is undesirable for two reasons: (a) the (small) exciting current for the inductive ratio standard 22 is taken from the potential terminals of the resistors 17 and 16: (b) and as shown, this exciting current would have to be drawn via all the multi-decade windings in cascade, causing a significant loss of accuracy. The excitation current is therefore removed from the measuring windings by the use of the arrangement described in connection with FIGS. 1 to 3.

FIG. 7 shows the combination of the improved inductive ratio standard with the circuit of FIG. 5. In FIG. 7, magnetising windings 41 and 42 correspond to windings 1 of FIG. 2. Resistors 43, 44 and 45, 46 enable the excitation of windings 41 and 42 to be finely adjusted so that the measuring windings, connected as shown, do not carry any current. Windings 41 and 42 are wound on a core 47. On this core are also wound the measuring windings 48, 49, 50 and 51, 52, 63. Windings 48 and 51, 49 and 52, 50 and 53 are tightly coupled, as by being, in pairs, wires of the same ropes.

Windings 48, 49, 50 and 51, 52, 53 are connected in the conventional manner as inductive ratio standards. For illustration, three decades are shown, but any number of decades may be employed, depending on the precision required. The windings may be disposed in any appropriate way on one or more cores, each core carrying one or more windings. Windings 50 and 53 on core 58 are an example of a possible method.

The points 59 and 60, which would normally be the outputs of the inductive ratio standards, are connected to the "outer" potential terminals of the standard and unknown resistors 60 and 61 via contacts 54 and 57. The other ends of the measuring inductive ratio standards are connected via windings 63 and 64 to the "inner" potential terminals of the standard and unknown resistors via contacts 55 and 56. Windings 63 and 64 form the twin tightly coupled primaries of core balance transformer 65 whose secondary 66 feeds the detector 67. Contacts 68, 69, 70 and 71 connect the magnetising windings 41 and 42 to the current terminals of the standard and unknown resistors, and hence to the source 72.

Inductive ratio standards 73, 74, 75 and 76, 77, 78 are interposed in the feeds to the magnetising windings. They are similar, respectively, to inductive ratio standards 48, 49, 50 and 51, 52, 53. The windings are ganged in pairs 73 with 48, 74 with 49, 75 with 50, and 76 with 51, 77 with 52, 78 with 53. This arrangement ensures that, once a setting for (for example) the magnetising winding 42 has been obtained by adjusting resistors 45 and 46, this setting will hold no matter how the measuring inductive ratio standard 51, 52, 53 is altered while obtaining a balance.

Contacts 83, 84, 85 and 86 connect the magnetising winding and inductive ratio standards in the reverse sense at intervals so as to maintain zero mean core flux. Similarly, contacts 79, 80, 81 and 82 reverse the measuring inductive ratio standard. Referring to FIG. 6, it can be considered that contacts 54, 55, 56, 57, 68, 69, 70 and 71 are associated with relay RLA, and contacts 79, 80, 81, 82, 83, 84, 85 and 86 with relay RLB. As with FIGS. 5 and 6, contact 87 (FIG. 7), associated with relay RLC, connects the detector 67 to the transformer winding 66 after the switching transients have died down. Similarly, contact 88 (on relay RLD) connects resistor 89 across the winding 66 to nullify any D.C. flux in the core 65.

In place of the detector arrangement shown, a purely electronic phase sensitive (gating) detector may be used.

In operation, it is first of all necessary to adjust the magnetising windings 41 and 42 so that the measuring windings are carrying no current. The "standard" and "unknown" sides are adjusted separately in sequence. Contacts 56, 57, 81, 82, 70, 71, 85 and 86 are held open. Resistors 43 and 44 are adjusted for a null on the detector showing that there is no current in the measuring winding. Resistors 45 and 46 are similarly adjusted while holding contacts 54, 55, 68, 69, 79, 80, 83, 84 open. The setting of the "standard" inductive ratio standard is adjusted to the known value of the standard and the "unknown" inductive ratio standard is adjusted for a null on the detector. Its indication is then the true value of the unknown.

We claim:

1. A resistance comparison device comprising, in combination: a bridge circuit having four arms; a first resistor forming a first arm of said bridge; means for connecting an unknown resistor into a second arm thereof, said first resistor and unknown resistor connecting means being connected in series; a variable inductive ratio standard being connected in the other two arms of said bridge, adjustable contact means for movement along the inductive path thereof; means for connecting a source of steady direct current across the first and second arms, means for connecting a detector means between the contact means and the junction point of the first resistor and the unknown resistor connecting means; and first and second switch means being connected to each end of said inductive standard respectively, for connecting to and disconnecting from said bridge circuit, whereby the standard resistor and the unknown resistor are operated on steady D.C. and the inductive ratio standard is operated on a form of alternating current maintaining a cyclic flux state in said magnetic core.

2. Circuitry according to claim 1, wherein said inductive ratio standard comprises a slave winding to supply core magnetising flux, and at least one measuring winding having its E.M.F. produced solely by electromagnetic induction from the slave winding and core, the turns ratio between the measuring winding and the slave winding being such that the measuring winding carries no current although connected to the same supply.

3. Circuitry according to claim 2, wherein the measuring winding is laid on the core over the slave winding with a non-short-circuiting earthed electrostatic screen between.

4. Circuitry according to claim 2, wherein a small step-up turns ratio exists between the slave winding and the measuring winding such that the E.M.F. induced into into the measuring winding exactly equals the supply voltage.

5. Circuitry according to claim 4, wherein the numbers of turns in the two windings are selected nominally equal except that the step-up ratio is achieved by a reduction in the number of turns of the slave winding from the selected nominal value.

6. Circuitry according to claim 2, wherein the measuring winding has an extension beyond one end terminal connection to said switch means such that the total measuring winding plus extension delivers a larger E.M.F. than the supply voltage of said direct current source.

7. Circuitry according to claim 1, wherein said inductive ratio standard comprises two measuring windings which are tightly coupled, and each of said first resistor and said unknown resistor connecting means is connected across a respective one of said two measuring windings.

8. Circuitry according to claim 7, comprising relay means controlling said switch means to reverse the connections of each of said first resistor and said unknown resistor connecting means to its respective measuring winding cyclically, whereby the core of the inductive ratio standard is maintained in a cyclic state with a zero mean flux level.

9. Circuitry according to claim 8, wherein the means for connecting said detector means comprise a core-balance transformer with two primary windings, each of said first resistor and said unknown resistor connecting means has a connection to a particular terminal of its respective measuring winding through a respective one of the two transformer primary windings, and the detector means is connected into a circuit including a secondary winding of said transformer.

10. Circuitry according to claim 9, further comprising a compensating resistor equal to the D.C. resistance of said detector means, and switch means connecting said detector means across said transformer secondary winding during one half cycle of the cyclical operation, and connecting said compensating resistor across said secondary winding during the other half cycle.

References Cited

UNITED STATES PATENTS 3,334,296   8/1967   Rogal et al. _____ 324—62

OTHER REFERENCES

Buse, German printed application, No. 1, 172,371, pub. June 18, 1964. (1 sh. dwg., 3 pp. spec.)

Honrath, German printed application, No. S 39,176, pub. Nov. 3, 1955. (1 sh. dwg., 3 pp. spec.)

EDWARD E. KUBASIEWCZ, Primary Examiner

U.S. Cl. X.R.

336—84